United States Patent
Yan et al.

(10) Patent No.: US 8,768,774 B2
(45) Date of Patent: Jul. 1, 2014

(54) ADVERTISEMENTS WITH MULTIPLE TARGETING CRITERIA BIDS

(75) Inventors: Rong Yan, Mountain View, CA (US); Huajing Li, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 86 days.

(21) Appl. No.: 13/306,626

(22) Filed: Nov. 29, 2011

(65) Prior Publication Data

US 2013/0138514 A1    May 30, 2013

(51) Int. Cl.
*G06Q 30/00* (2012.01)
(52) U.S. Cl.
USPC ............. 705/14.71; 705/14.42; 705/14.49; 705/14.68; 705/14.73
(58) Field of Classification Search
CPC ..................................... G06Q 30/02
USPC ........ 705/14.42, 14.49, 14.4, 14, 68, 30, 400, 705/500, 14.71, 14.73
See application file for complete search history.

(56) References Cited

U.S. PATENT DOCUMENTS

| | | | |
|---|---|---|---|
| 2006/0242017 A1* | 10/2006 | Libes et al. ..................... | 705/14 |
| 2009/0210385 A1 | 8/2009 | Ramaswamy et al. | |
| 2010/0235266 A1* | 9/2010 | Sirajuddin et al. ............. | 705/30 |
| 2010/0257058 A1* | 10/2010 | Karidi et al. ............... | 705/14.55 |
| 2010/0324990 A1 | 12/2010 | D'Angelo et al. | |
| 2011/0106618 A1* | 5/2011 | Ben-Moshe ............... | 705/14.49 |

OTHER PUBLICATIONS

PCT International Search Report and Written Opinion, PCT Application No. PCT/US2012/063941, Jan. 22, 2013, thirteen pages.

* cited by examiner

*Primary Examiner* — Sun Li
(74) *Attorney, Agent, or Firm* — Fenwick & West LLP

(57) ABSTRACT

An advertising system may enable an advertiser to associate multiple targeting criteria bids with an advertisement. The targeting criteria bids include a bid amount and a targeting criteria defining a group of users who may be delivered the advertisement. The cost for the advertisement is the sum of the bid amounts associated with the targeting criteria that match the user profile of the viewing user.

22 Claims, 4 Drawing Sheets

Diagram 300

ADVERTISEMENTS WITH MULTIPLE TARGETING CRITERIA BIDS

BACKGROUND

This invention relates generally to online advertising and in particular to providing advertisements to users of online system using multiple bids associated with different targeting criteria.

Some advertising systems use a bid-based model in which advertisers bid against each other to advertise to groups of users. These advertising systems typically allow an advertiser to provide a single bid with an advertisement, which also has associated targeting criteria. This limits the advertiser's ability to target the advertisement differently to different groups of users. For example, if an advertiser of an advertisement assigned a bid to users who like basketball and/or football, the advertisement would not be targeted equally to users who like basketball only, football only, or both football and basketball. But an advertiser may value these groups of users differently. To target to these groups differently, the advertiser would have to create three separate ad campaigns with different bid amounts to advertise to users who like basketball, users who like football, and users who like both basketball and football. As such, there is a need for an advertising system that enables advertisers to associate multiple targeting criteria bids with an advertisement.

SUMMARY

Systems and methods are disclosed herein for an advertising system that enables advertisers to associate multiple targeting criteria bids with an advertisement. Each targeting criteria bid is associated with a different targeting criteria, which defines a group of users to whom the advertisement may be delivered. This allows an advertiser to target an advertisement differently to multiple groups of users and gives an advertiser greater control over how to spend the advertising budget.

In one embodiment, multiple targeting criteria bids are received for an advertisement. Each targeting criteria bid includes a bid amount and targeting criteria which defines a group of users to whom the advertisement may be delivered. For example, the advertiser may assign a first bid to a first targeting criteria and a second bid to a second targeting criteria. Each targeting criteria corresponds to a group of users. For example, the first targeting criteria may specify users who are in a certain age range (e.g., ages 30-40) and the second targeting criteria may specify users in a geographic location (e.g., California). The advertisement is displayed to a viewing user that satisfies at least one of the targeting criteria of the advertisement. A cost for advertisement is determined, and the advertiser is charged the cost. The cost of the advertisement is based on the sum of the targeting criteria bids of the targeting criteria satisfied by the viewing user. For example, if a user satisfied two targeting criteria of an advertisement, the cost for the advertisement is the sum of the targeting criteria bids for the two targeting criteria.

By associating multiple targeting criteria bids with an advertisement, the advertisement can be targeting to multiple groups of users. Using the previous example, the advertisement may be displayed to users who are 30-40 years old, users who live in California, or users who both live in California and are 30-40 years old. Associating multiple targeting bid amounts to an advertisement gives an advertiser greater control over the advertisement's audience composition. Using the previous example, an advertiser may assign a higher bid to users who live in California than to users who are 30-40 years old in order to ensure that a majority of the users viewing the corresponding advertisement live in California.

The figures depict various embodiments of the described methods and system and are for purposes of illustration only. One skilled in the art will readily recognize from the following discussion that alternative embodiments of the methods and systems illustrated herein may be employed without departing from the principles of the methods and systems described herein.

DETAILED DESCRIPTION

Overview

Figure 1:
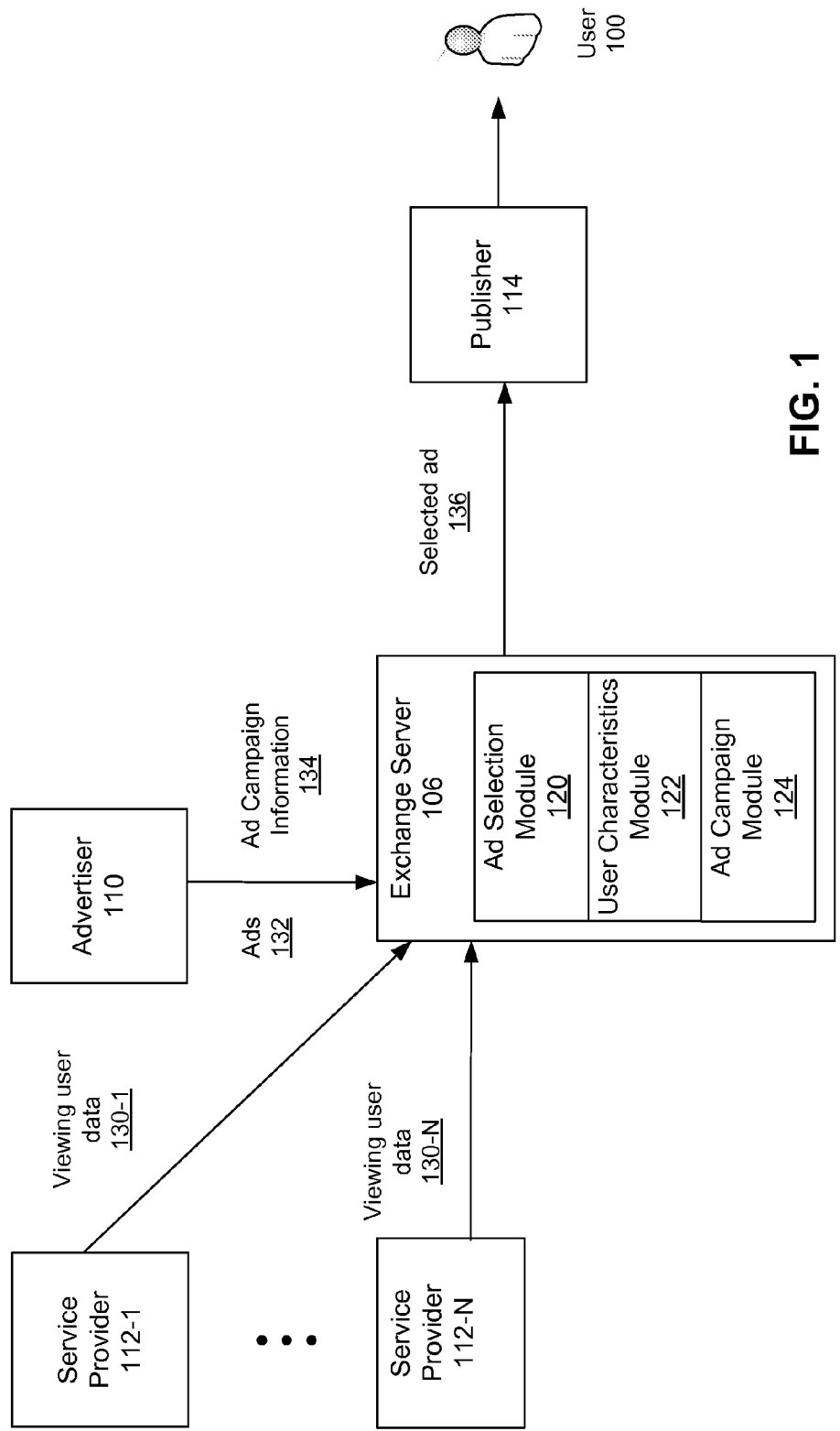
FIG. 1 is a high level block diagram illustrating a system environment suitable for associating multiple targeting criteria bids with an advertisement, in accordance with one embodiment of the invention.

FIG. 1 is a diagram of a process for associating multiple targeting criteria bids with an advertisement, in accordance with one embodiment. In one embodiment, one or more service providers 112 send user data 130 to an exchange server 106. An advertiser 110 sends advertisements 132 and associated advertisement information 134 to the exchange server 106. The ad information 134 includes targeting criteria, targeting criteria bids, budget information, pacing information, and duration information. An ad module 120 on the exchange server selects an advertisement ("ad") to display to a viewing user. In order to select an advertisement, the ad module 120 identifies a set of advertisements that have at least one targeting criteria matching the viewing user's user data and selects an advertisement from the set having the highest bid. An advertisement's bid is a sum of the targeting criteria bids associated with the targeting criteria that the viewing user satisfies. For example, if the viewing user satisfies two targeting criteria of an advertisement, the advertisement's bid for the viewing user is a sum of the targeting criteria bids associated with the satisfied targeting criteria. The exchange server 106 sends the selected advertisement 136 to the viewing user's device 100. The ad cost module 122 updates an account associated with the advertiser with the cost for the selected advertisement 136.

A service provider 112 includes any entity that provides data or an online service to a user over a network, including but not limited to social networking systems, web retailers, news providers, video content item providers, etc. The embodiments disclosed herein may include one or more service providers 112. The exchange server 106 may be a service provider, a social networking system, or another entity.

The user data 130 provided by the service providers 130 may include biographic, demographic and other types of descriptive information (birthday, age, work experience, gender, educational history, hobbies or preferences, interests, geographic location, marital status, household size, political party, and the like). The user data 130 may also include profile information, browsing history, purchasing history, and content item viewing history. The user data 130 may also include affinity scores for other users, types of actions, types of objects, and content.

An advertiser 110 is an entity that provides advertisements 132 and advertisement information 134. In one embodiment, an advertisement is a web-based ad that is displayed in the margins or other dedicated area of a website. The advertisements may include banners ads, floating ads, expanding ads, wallpaper ads, pop-up ads, pop-under ads, video ads, map ads, animations, email ads, and mobile ads. As discussed above, the advertisement information 134 for an advertisement includes targeting criteria, targeting criteria bids, budget information, pacing information, and duration information.

The targeting criteria include characteristics of the intended audience of an advertisement. The user characteristics may include any information associated with a user described above, including declared information from the user's profile, historical information based on the user's activity, or social information about other users with whom the user is connected. An advertisement may be associated with multiple targeting criteria. In some embodiments, targeting criteria is included with a targeting criteria bid.

A targeting criteria bid is associated with targeting criteria and indicates the amount of money an advertiser is willing to spend to advertise to the users corresponding to the targeting criteria. In some embodiments, a targeting criteria bid includes a bid amount and targeting criteria. Multiple targeting criteria bids may be associated with an advertisement. For example, an advertisement targeting 25 year old users in California may have a targeting criteria bid for 25 year old users and another targeting criteria bid for users in California. A bid amount may be positive or negative. An advertiser may use a negative bid in order to exclude certain groups of users. For example, an advertiser may assign a positive bid (e.g., one dollar) to users living in California and a negative bid (e.g., negative one dollar) to users living in San Francisco in order to advertise to users in California who do not live in San Francisco. An advertiser may also assign a negative bid to targeting criteria in order to prioritize certain groups of users or to decrease the probability of advertising to certain users. For example, an advertiser may assign a bid of two dollars for users living in California and a bid of negative one dollar for users living in San Francisco in order to prioritize advertising to users in California who do not live in San Francisco or to decrease the likelihood of advertising to users in San Francisco. In some embodiments, a bid amount may be for a bid type. The bid type is per click or per impression.

A targeting criteria bid may be associated with one or more targeting criteria. For example, an advertiser may assign a bid of one dollar to a first targeting criteria and a bid of two dollars to a second targeting criteria. In some embodiments, an advertiser may assign a bid for users corresponding to both the first criteria and the second criteria, and a bid of six dollars to users corresponding to both the first targeting criteria and the second criteria.

The duration information specifies a period of time an advertisement is available for display to users. For example, the duration may specify a starting time and an ending time. The budget information includes the amount of money an advertiser has allocated for an advertisement. An advertiser may specify a budget amount for each targeting criteria of an advertisement. The pacing information indicates a rate at a targeting criteria bid may be used in determining an advertisement's bid. For example, the pacing information may specify that a targeting criteria bid for users in California may be used once an hour.

The ad module 120 identifies a viewing user, retrieves user data for the viewing user, determines a set of candidate advertisements, ranks the advertisements, and selects an advertisement for the viewing user. The viewing user may be identified by a user identifier that correlates to the user profile for the viewing user. The user identifier may be received when the user requests a page of the online system or opens a native application.

The ad module 120 selects an advertisement from a ranked set of candidate advertisements to display to a viewing user. The ad module 120 determines a set of candidate advertisements that have at least one targeting criteria that matches the viewing user's characteristics. In some embodiments, the ad module 120 determines advertising bids for each of the set of advertisements. The advertising bid for an advertisement is also the cost charged to the advertiser to display the advertisement. The advertising bid cannot be smaller than zero in order for the advertisement corresponding to the advertising bid to be selected or displayed.

In some embodiments, an advertisement's advertising bid for a viewing user is a sum of the targeting criteria bids associated with the targeting criteria satisfied by the viewing user. In some embodiments, an advertisement's advertising bid is a sum of a subset of the targeting criteria bids associated with targeting criteria satisfied by the viewing user. For example, if a viewing user satisfies three targeting criteria of an advertisement, one or two of the targeting criteria bids associated with the satisfied targeting criteria may be used to determine the advertisement's advertising bid. The subset of the targeting criteria bids may be selected by a pacing algorithm stored with the ad module 120.

The pacing algorithm evenly spreads out the number of times a targeting criteria bid for an advertisement may be used. In some embodiments, the pacing algorithm selects a targeting criteria bid based on pacing information associated with an advertisement. For example, the pacing information may indicate that a respective targeting criteria bid may be used once an hour. In some embodiments, the pacing algorithm selects a targeting criteria bid based on the bid amount, remaining budget for the bid, and the time remaining for the advertisement. The pacing algorithm divides the remaining budget by the bid amount to determine a number of times the bid may be used. For example, if the remaining budget for a bid is 20 dollars and the bid amount is 2 dollars, the number of times the bid may used is 10 (i.e., 20 divided by 2). The pacing algorithm then divides the remaining time by the determined number of times the bid may be used. For example, when there is an hour remaining for the advertisement and the remaining number of times the targeting criteria bid can be used is 10, the pacing algorithm determines that the targeting criteria bid should be used every six minutes (i.e., 60 minutes divided by 10). Using this example, the targeting criteria bid may be used if six minutes or more have elapsed since the last time the targeting criteria bid was used.

In some embodiments, the ad module 120 determines a set of candidate advertisements that include content that the viewing user has at least a threshold amount of affinity for. For example, the set of candidate advertisements may include an advertisement about action movies if the viewing user has a sufficient affinity for action movies. The viewing user's affinity for the content of the information in an advertisement acts as a proxy for the likelihood that the viewing user will click on the advertisement. In some embodiments, the ad module 120 determines affinity scores for the set of candidate advertisements that have at least one targeting criteria that matches the viewing user's profile. The affinity score may be based on a weighted function that takes into account the set of affinities for the particular viewing user has for each type of data field that is in a candidate advertisement. The member's affinities may be obtained from the viewing user's express interests (whether provided directly or indirectly, for example, through communications with other users) and/or impliedly based on the user's actions (e.g., a user's checking of another user's page indicates an interest in that other user, or clicking on particular types of links may indicate an interest in similar links).

The ad module 120 ranks the set of candidates advertisements based on the advertising bids for the advertisements and/or the viewing user's affinity for the advertisements and selects the highest ranked advertisement.

The ad cost module 122 updates the advertisement information for an advertisement with the cost for an advertisement. In particular, after the advertisement is displayed to a viewing user, the ad cost module 122 decreases the budgets for the targeting criteria satisfied by a viewing user. An advertiser may be charged based on a cost per click model or a cost per impression model.

These embodiments described for associating multiple targeting criteria bids with advertisements are merely meant to be exemplary and are not intended to be restrictive. In other embodiments, there are more or fewer components performing the same or substantially similar functions as the components of the embodiment of FIG. 1. In addition, as will be discussed below, in some embodiments, the functionality of the ad module 120 may be provided by the exchange server 106; in other embodiments, all or part of this functionality may be provided external to the exchange server 106.

Advertising System Overview

Figure 2:
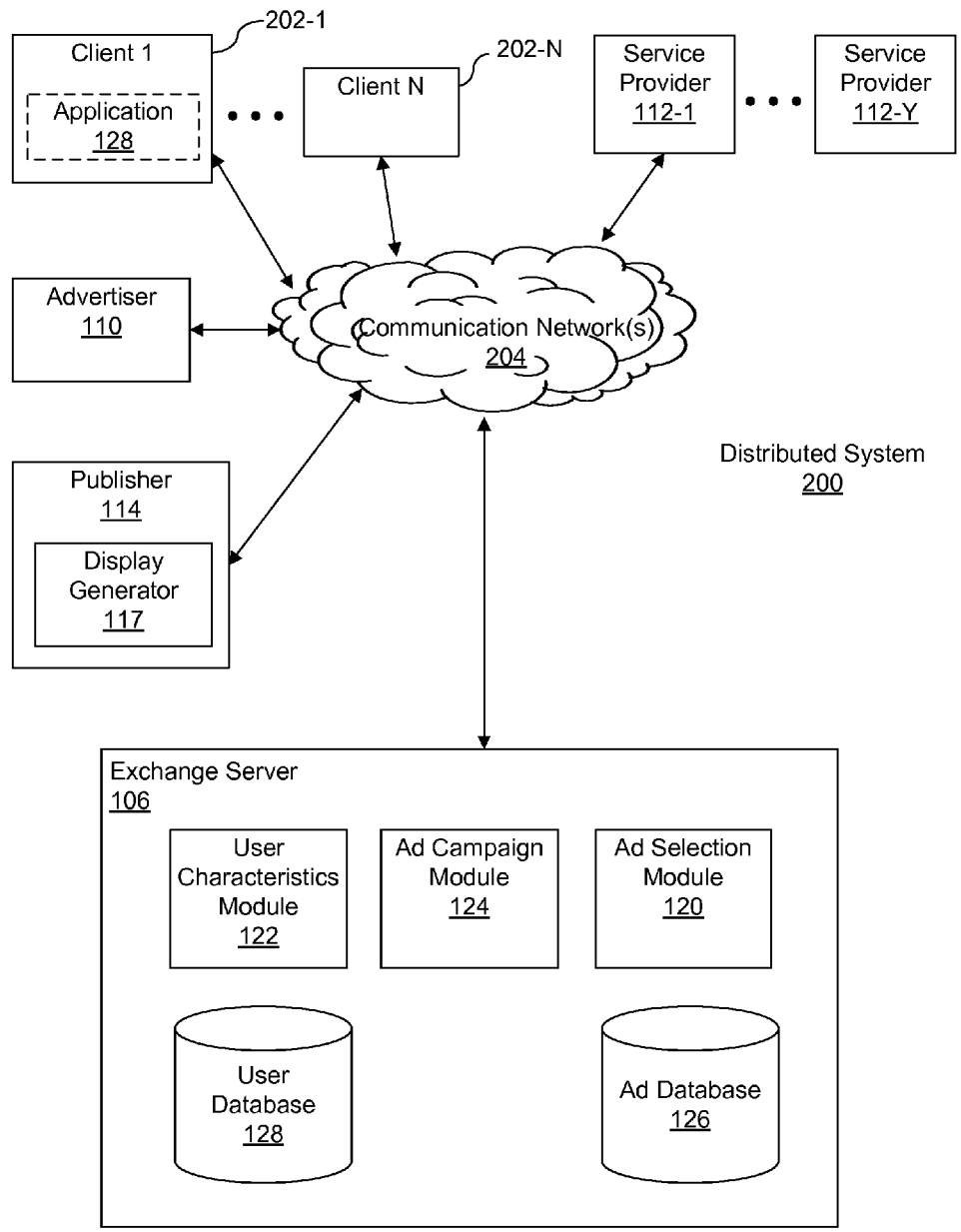
FIG. 2 is a high level block diagram illustrating a system environment suitable for associating multiple targeting criteria bids with an advertisement, in accordance with one embodiment of the invention.

FIG. 2 is a high level block diagram of a distributed system 200 of an online system according to one embodiment of the invention. The distributed system 200 includes one or more user devices 202, an advertiser 110, one or more service providers 112, a publisher 214 and an exchange server 106 connected by a network 204. In some embodiments, the exchange server 106 is implemented as a single server, while in other embodiments it is implemented as a distributed system of multiple servers. For convenience of explanation, the exchange server 106 is described below as being implemented on a single server system, but the exchange server 106 may be implemented on a plurality of server computers. Additionally, the advertiser 110, service provider 112 and publisher 214 may each be implemented on a plurality of server computers.

The communication network(s) 204 can be any wired or wireless local area network (LAN) and/or wide area network (WAN), such as an intranet, an extranet, or the Internet. It is sufficient that the communication network 204 provides communication capability between the user devices 202 and the exchange server 106. In some embodiments, the communication network 204 uses the HyperText Transport Protocol (HTTP) and the Transmission Control Protocol/Internet Protocol (TCP/IP) to transmit information between devices or systems. HTTP permits user device 202 to access various resources available via the communication network 204. The various embodiments of the invention, however, are not limited to the use of any particular protocol.

A user interacts with the exchange server 106 using a user device 202, which may be any suitable computer device that is capable of connecting to the exchange server 106 via communication network 204, such as a computer, a desktop computer, a laptop computer, a tablet device, a netbook, an internet kiosk, a personal digital assistants, a mobile phone and a gaming device. The user device 202 may communicate with the server system 106 via an application 228 such as a web browser or native application. Typical interactions between the user device 202 and the server system 106 include operations such as viewing profiles of other users of the exchange server 106, sending messages to other users, contributing and interacting with media items, joining groups, listing and confirming attendance at events, and performing other tasks that facilitate social interaction.

The ad database 232 stores advertisements. In some embodiments, the ad database 126 resides on the advertiser's server 110. The user database 230 stores the user data described above.

A publisher 214 is an entity that sends an advertisement to a user device for display to a viewing user. A publisher 214 may include, for example, a service provider 112 such as a newspaper, a video content provider, a web retailer, an email service provider, or a social networking system. In one embodiment, the publisher 214 receives an advertisement provided by the exchange server 106 and sends the advertisement to a user device 202 for display.

EXAMPLES

Figure 3A:
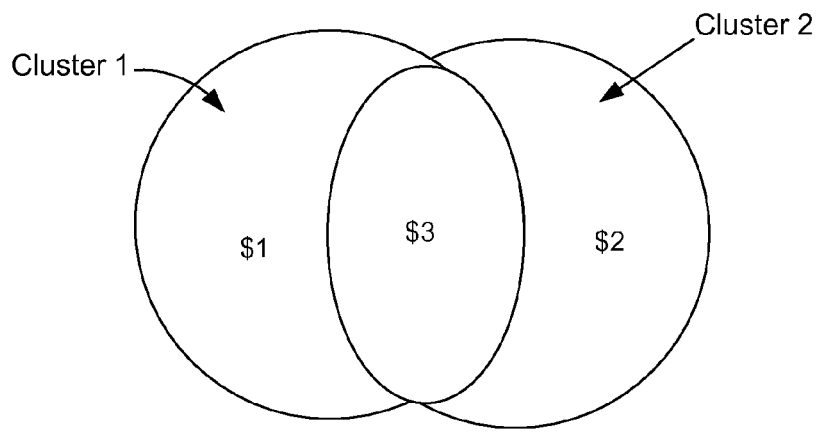
FIG. 3A illustrates aspects of associating multiple positive targeting criteria bids with an advertisement, in accordance with one embodiment of the invention.

FIG. 3A includes a diagram 300 illustrating aspects of associating positive bids with an advertisement. Diagram 300 illustrates positive targeting criteria bids associated with clusters (i.e., cluster 1 and cluster 2) of users targeting by an advertisement. Cluster 1 has a bid amount of one dollar and cluster 2 has a bid amount of two dollars. When a viewing user belongs to cluster 1 only, the advertisement's bid for the viewing user is one dollar. When a viewing user belongs to cluster 2 only, the advertisement's bid for the viewing user is two dollars. When the viewing user belongs to both cluster 1 and cluster 2, the advertisement's bid for the viewing user is the sum of the bid amounts for cluster 1 and cluster 2 (i.e., three dollars). In some embodiments, a bid amount may be associated with the overlap of two clusters. For example, there may be a bid amount for the users belonging to both cluster 1 and cluster 2 that is different bid than the sum of the bid amounts for cluster 1 and cluster 2.

Figure 3B:
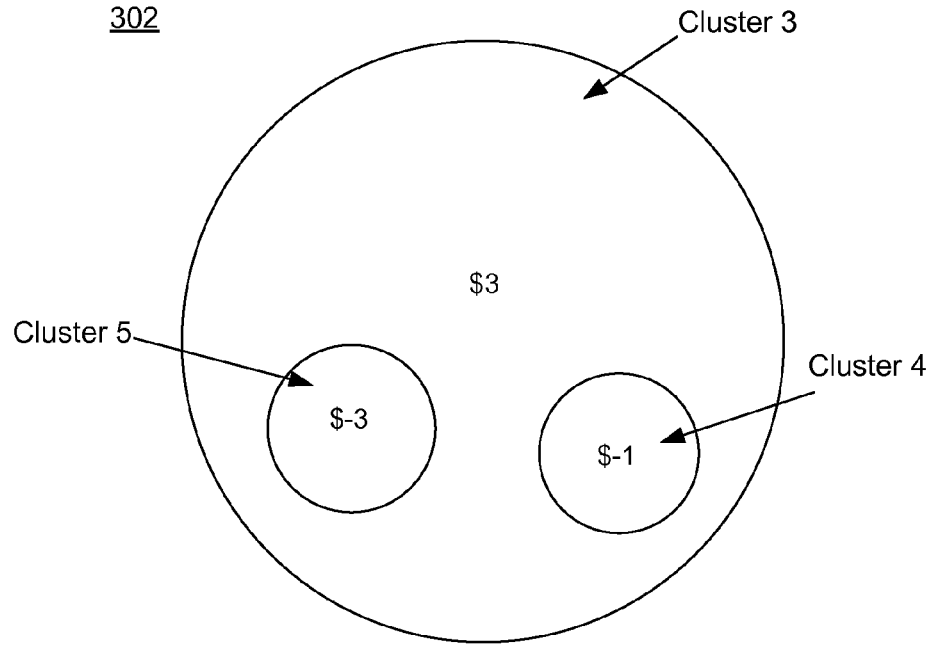
FIG. 3B illustrates aspects of associating negative targeting criteria bids with an advertisement, in accordance with one embodiment of the invention.

FIG. 3B includes a diagram 302 illustrating aspects of associating negative targeting criteria bids with an advertisement. In diagram 302, cluster 3 has a bid of three dollars, cluster 5 has a bid of negative three dollars, and cluster 4 has a bid of negative one dollar. When a viewing user belongs to cluster 3 only, the advertisement's bid for the viewing user is three dollars. When the viewing user belongs to cluster 3 and cluster 5, the advertisement's bid for the viewing user is zero dollars. Thus, in this case, the advertiser has chosen not to advertise to viewing users belonging to both cluster 3 and cluster 5. When a viewing user belongs to cluster 3 and cluster 4, the advertisement's bid for the viewing user is two dollars. In this case, the advertiser has assigned a lower priority to a viewing user belonging to both cluster 3 and cluster 5 than to a viewing user belonging to cluster 3 only. Stated in another way, the advertiser is willing to pay more to advertise to a viewing user belonging to cluster 3 than to a viewing user belonging to both cluster 3 and cluster 4.

Advertisements with Multiple Targeting Criteria Bids

Figure 4:
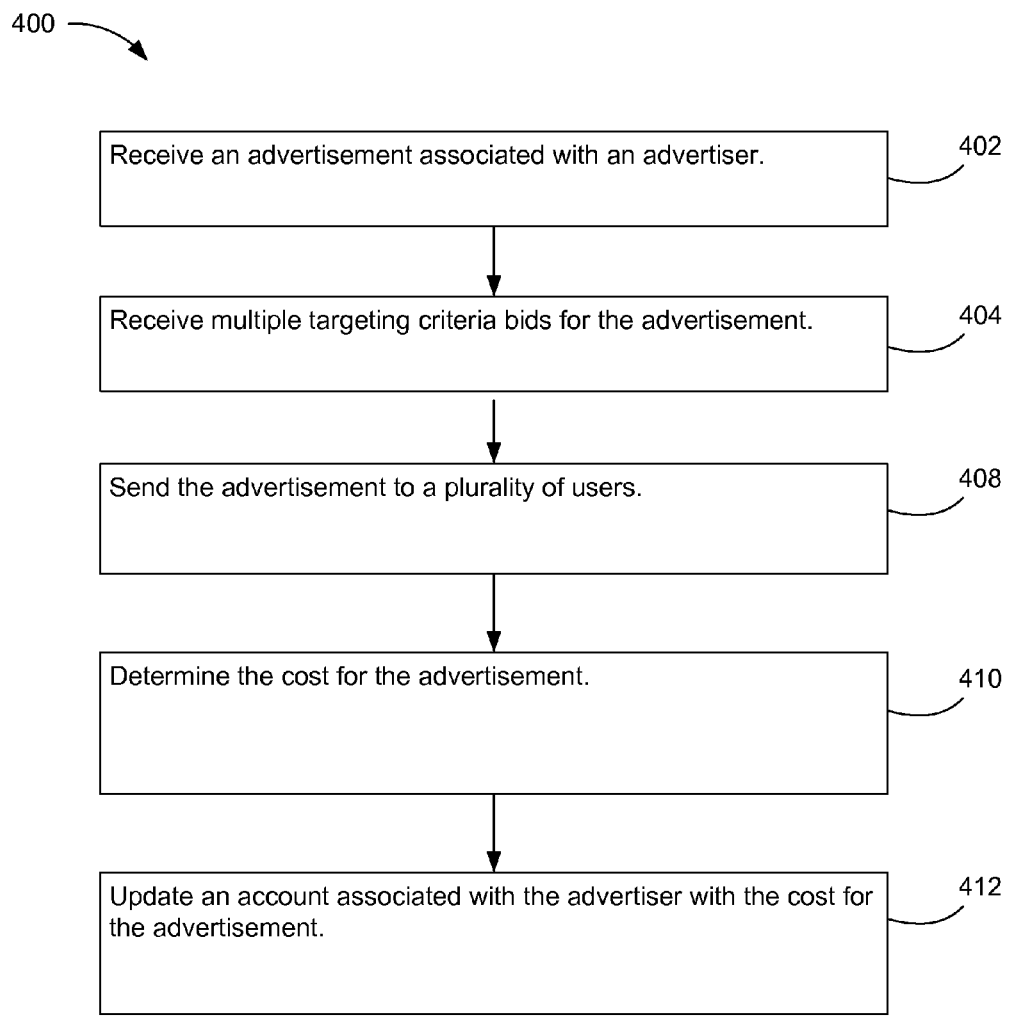
FIG. 4 is a flow chart illustrating a process for associating multiple targeting criteria bids with an advertisement, in accordance with an embodiment of the invention.

FIG. 4 is a flow chart of a process 400 for associating multiple targeting criteria bids with an advertisement, in accordance with one embodiment of the invention. The process 400 is performed at a server system (e.g., server system 106) having one or more processors and non-transitory memory. The non-transitory memory stores one or more programs to be executed by the one or more processors. The one or more programs include instructions for carrying out process 400.

In this process 400, an advertisement associated with an advertiser is received 402. The ad module 120 may receive the advertisement from an advertiser 110 or retrieve the advertisement from the ad database 232.

Multiple targeting criteria bids are received 404 for the advertisement. For example, the advertisement may receive a first targeting criteria bid and a second targeting criteria bid. A targeting criteria bid includes a bid amount and targeting criteria defining a group of users who may be delivered the advertisement. Using the previous example, the first targeting criteria bid may include a first targeting criteria that specifies users in California and a first bid amount of one dollar. Continuing with this example, the second targeting criteria bid may include a second targeting criteria that specifies users interested in movies and a second bid amount of negative one dollar. In some embodiments, the targeting criteria include a plurality of user characteristics. The targeting criteria of an advertisement may have at least one user characteristics in common or at least one overlapping user characteristic. The user characteristics of one targeting criteria may be a subset of the user characteristics of another targeting criteria. Using the previous example, a third targeting criteria of a third targeting criteria bid may include both the first targeting criteria and the second targeting criteria. The bid amounts may be positive or negative. As discussed above, an advertiser may use negative bids in order to target certain audiences. For example, the advertiser may ensure that the advertisement is displayed to users outside of California that like movies by assigning a bid of one dollar to users interested in movies and assigning a bid of negative one dollar to users in California. The ad module 120 may receive the targeting criteria bids from the advertiser 110 or retrieve the targeting criteria bids from the ad database 232.

In some embodiments, budget amounts are received for the targeting criteria bids. Using the previous example, a first budget amount for the first targeting criteria bid is received and a second budget amount for the second targeting criteria bid is received. The budget amount for a targeting criteria bid is the amount of money the advertiser is willing to spend to advertise to users corresponding to the targeting criteria of the targeting criteria bid. For example, an advertiser may allocate 100 dollars to advertise to users in California and 200 dollars to advertise to users interested in movies.

The advertisement is sent 408 to a plurality of viewing users. In particular, the advertisement is sent to each of a plurality of viewing users whose profiles satisfy at least one of the targeting criteria associated with the advertisement. In some embodiments, the advertisement is sent to a viewing user when the advertisement's bid for the viewing user is higher than bids from other advertisements, where an advertisement's bid for a user is the sum of the bids associated with the advertisement whose associated targeting criteria is satisfied by the viewing user.

The cost for the advertisement is determined 410. The cost for the advertisement is based on the cost for each viewing user. The cost for each viewing user is a sum of bid amounts whose associated targeting criteria was satisfied by the viewing user. Using the previous example, the cost for the viewing user is the first bid amount if the viewing user satisfies only the first targeting criteria, the second bid amount if the viewing user satisfies only the second targeting criteria, and the sum of the first and second bid amounts if the viewing user satisfies both the first and second targeting criteria.

An account associated with the advertiser is updated 412 with the cost for the advertisement. In some embodiments, each time the advertisement is displayed to a viewing user, the budgets for the targeting criteria that the user's profile satisfied are decremented by the associated targeting criteria bid amount. Using the previous example, if the viewing user is interested in movies, the budget to advertise to users interested in movies is decremented by the associated targeting criteria bid amount. In some embodiments, the advertiser is charged the cost of the advertisement based on a cost per click model. In some embodiments, the advertiser is charged the cost of the advertisement based on a cost per impression model.

SUMMARY

The foregoing description of the embodiments of the invention has been presented for the purpose of illustration; it is not intended to be exhaustive or to limit the systems and methods to the precise forms disclosed. Persons skilled in the relevant art can appreciate that many modifications and variations are possible in light of the above disclosure.

Some portions of this description describe the embodiments of the systems and methods in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the systems and methods may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the systems and methods may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the systems and methods systems and methods be limited not by this detailed description, but rather by any claims that issue on an application based hereon. Accordingly, the disclosure of the embodiments of the systems and methods are intended to be illustrative, but not limiting, of the scope of the invention, which is set forth in the following claims.

What is claimed is:

1. A computer-implemented method comprising:
receiving an advertisement associated with an advertiser;
receiving a first targeting criteria for the advertisement and a first bid associated with the first targeting criteria;
receiving a second targeting criteria for the advertisement and a second bid associated with the second targeting criteria;
identifying a plurality of viewing users whose profiles satisfy at least one of the first targeting criteria and the second targeting criteria;
determining, by a computer processor, for each of the identified plurality of viewing users whose profiles satisfy both the first targeting criteria and the second targeting criteria an aggregated bid for the advertisement that is the sum of the first and second bids; and
applying the determined aggregated bid for advertisement selection for each of the identified plurality of viewing users.

2. The method of claim 1, wherein the identified plurality of viewing users whose profiles satisfy both the first targeting criteria and the second targeting criteria comprise a first cluster of users, and wherein the method further comprises receiving a third bid that is a negative bid, the third bid associated with a third targeting criteria that defines a second cluster of users that is a subset of the first cluster.

3. The method of claim 2, wherein the aggregated bid is a positive bid, and wherein a viewing user, of the plurality of viewing users, who satisfies the targeting criteria associated with the positive bid, but not the targeting criteria associated with the negative bid, has a higher priority to the advertiser than one or more other viewing users, of the plurality of viewing users, who satisfy the targeting criteria associated with the negative bid.

4. The method of claim 2, wherein the aggregated bid is a positive bid, and wherein the sum of the negative bid and the positive bid is zero.

5. The method of claim 2, wherein the aggregated bid is a positive bid and wherein the negative bid allows the advertiser to exclude the second cluster of users from receiving the advertisement.

6. The method of claim 1, wherein at least one of the first targeting criteria and the second targeting criteria include a plurality of user characteristics.

7. The method of claim 1, wherein the first targeting criteria and the second targeting criteria include at least one common user characteristic.

8. The method of claim 1, further comprising:
receiving a first budget amount for the first targeting criteria; and
receiving a second budget amount for the second targeting criteria.

9. The method of claim 8, further comprising decreasing a budget amount whose associated targeting criteria was satisfied by the viewing user.

10. The method of claim 1, wherein the advertisement is selected in the advertisement selection process and the advertiser is charged an amount based on a cost per click model.

11. The method of claim 1, wherein the advertisement is selected in the advertisement selection process and the advertiser is charged an amount based on a cost per impression model.

12. The method of claim 1, wherein the targeting criteria include a plurality of user characteristics.

13. The method of claim 1, wherein at least two of the plurality of targeting criteria bids include targeting criteria having at least one common user characteristic.

14. The method of claim 1, wherein the advertisement is selected in the advertisement selection process and the advertiser is charged an amount based on a cost per click model.

15. The method of claim 1, wherein the advertisement is selected in the advertisement selection process and the advertiser is charged an amount based on a cost per impression model.

16. The method of claim 1, wherein the second bid is a negative bid.

17. A non-transitory computer readable storage medium storing one or more programs, the one or more programs comprising instructions for:
receiving an advertisement associated with an advertiser;
receiving a first targeting criteria for the advertisement and a first bid associated with the first targeting criteria;
receiving a second targeting criteria for the advertisement and a second bid associated with the second targeting criteria;
identifying a plurality of viewing users whose profiles satisfy at least one of the first targeting criteria and the second targeting criteria;
determining, for each of the identified plurality of viewing users whose profiles satisfy both the first targeting criteria and the second targeting criteria an aggregated bid for the advertisement that is the sum of the first and second bids; and
applying the determined aggregated bid for advertisement selection for each of the identified plurality of viewing users.

18. A computer-implemented method comprising:
receiving an advertisement associated with an advertiser;
receiving a plurality of targeting criteria bids for the advertisement, each targeting criteria bid comprising a bid amount and a targeting criteria defining a group of users who may be delivered the advertisement;
identifying a viewing user whose profile satisfies at least one the targeting criteria of at least one of the targeting criteria bids;
determining, by a computer processor, an aggregated bid for the advertisement for the viewing user, the aggregated bid comprising a sum of the bid amounts of the targeting criteria bids whose targeting criteria was satisfied by the viewing user; and
applying the determined aggregated bid in an advertisement selection process for the viewing user.

19. The method of claim 18, wherein a targeting criteria bid of the plurality of targeting criteria bids includes a negative bid amount.

20. The method of claim 19, wherein the targeting criteria bid that includes a negative bid amount is satisfied by the viewing user.

21. The method of claim 18, further comprising:
receiving budget amounts for the targeting criteria bids.

22. The method of claim 21, further comprising decreasing a budget amount associated with the targeting criteria bids whose targeting criteria was satisfied by the viewing user.

* * * * *